United States Patent Office 3,031,373
Patented Apr. 24, 1962

3,031,373
8-QUINOLYL CARBONATE DERIVATIVES
Robert M. Schisla and Van R. Gaertner, Dayton, Ohio, assignors to Monsanto Chemical Company, St. Louis, Mo., a corporation of Delaware
No Drawing. Filed Aug. 31, 1959, Ser. No. 836,905
6 Claims. (Cl. 167—33)

This invention relates to new organic compounds useful as biological toxicants and to methods for their preparation.

The new compounds may be described generally as 8-quinolyl carbonates and are graphically described according to the following general formula:

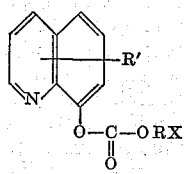

wherein the indicated ring structure is the 8-quinolyl radical, R is a hydrocarbon radical selected from the group consisting of alkyl, cycloalkyl, and phenyl substituted alkyl hydrocarbon radicals of from two to eight carbon atoms, X is a radical selected from the group consisting of halogen and hydrocarbonoxy radicals selected from the group consisting of alkoxy and cycloalkoxy radicals of one to six carbon atoms, and R' is a radical selected from the group consisting of hydrogen and methyl radicals.

Examples of compounds falling within the foregoing general formula are the following:

2-chloroethyl 8-quinolyl carbonate
3-chloropropyl 8-quinolyl carbonate
2-iodoethyl 8-quinolyl carbonate
2-bromoethyl 8-quinolyl carbonate
2-ethoxyethyl 8-quinolyl carbonate
2-cyclohexyloxyethyl 8-quinolyl carbonate
4-bromobutyl 8-quinolyl carbonate
4-chlorobutyl 8-quinolyl carbonate
3-ethoxypentyl 8-quinolyl carbonate
6-chlorohexyl 8-quinolyl carbonate
2,3,4,5,6-pentachlorohexyl 8-quinolyl carbonate
6-chloro-2-ethylhexyl 8-quinolyl carbonate
5,6-dichlorohexyl 8-quinolyl carbonate
7,8-dichlorooctyl 8-quinolyl carbonate
3,4-dichlorocyclopentyl 8-quinolyl carbonate
4-chlorocyclohexyl 8-quinolyl carbonate
2,3,4,5,6-pentachlorocyclohexyl 8-quinolyl carbonate
4-ethoxycyclohexyl 8-quinolyl carbonate
4-bromocyclohexyl 8-quinolyl carbonate
4-chlorophenyl 8-quinolyl carbonate
3,5-dibromophenyl 8-quinolyl carbonate
2,4,6-trichlorophenyl 8-quinolyl carbonate
2,3,4,5,6-pentachlorophenyl 8-quinolyl carbonate
4-chlorobenzyl 8-quinolyl carbonate
4-ethoxyphenyl 8-quinolyl carbonate Additional specific examples are provided where the methyl radical is substituted in the 8-quinolyl radical of the above-named compounds in either the 2, 3, 4, 5, 6 or 7 position of the ring structure.

The above-described compounds may be prepared by reacting 8-quinolinol with a chloroformate corresponding to the desired carbonate derivative in an appropriate reaction solvent, pyridine being suitable except when the substituted benzyl chloroformates are being employed. In these latter cases, it is desirable to employ solvents such as benzene or toluene and in instances an appropriate scavenger for HCl, e.g., $Na_2CO_3$. Care should be taken to avoid decomposition of the chloroformate by exothermic overheating, a suitable heat control method involving icing the reaction vessel. The 8-quinolinol is first dissolved in the solvent, e.g., pyridine, and the solution is charged to the reaction vessel. Thereafter, the chloroformate is slowly added with stirring. The mixture is maintained at about 40° C. while standing several hours, suitably overnight, with stirring, after which the pyridine is removed under vacuum with mild heating. The residue is then hydrolyzed with 3 N NaOH and washed several times with ether, discarding the aqueous layer. The ether layer is then stripped of excess ether and the residual material is distilled under vacuum. The thus isolated materials are found to contain the desired 8-quinolyl carbonate and it is recovered as indicated in the examples hereinafter. For the purpose of assisting in keeping the temperature of the reaction at a suitable level, it is desirable to employ a substantial excess of the reaction solvent. Also, in order to make up for loss of the chloroformate due to possible decomposition and to assure reaction of as much 8-quinolinol as possible, it is preferable to employ a substantial molar excess of the chloroformate, for example, a 50 percent or more excess; however, this is not necessary to obtain a significant yield of the desired product and may be undesirable in the case of the arylchloroformates since they may tend to effect decomposition of the product. In order to illustrate more fully the results that are obtained while employing the foregoing described procedure, the following examples are supplied:

Example I

A solution composed of 600 ml. of pyridine and 43.5 g. (0.3 mole) of 8-quinolinol was charged to a four-necked flask which was fitted with a stirrer, reflux condenser and thermometer, and mounted in an ice bath. 2-chloroethyl chloroformate in the amount of 67 g. (0.4 mole) was then slowly added to the solution and the reaction mixture thus formed was allowed to stand about 18 hours while stirring. The solvent, pyridine, was then removed under vacuum and mild heating, i.e., about 35–40° C. The residue was then hydrolyzed with 3 N NaOH and extracted several times with ether, discarding the aqueous layer. The ether layer is then stripped of excess ether, and a thick viscous syrup was obtained. The crystalline material which formed therefrom was the substantially pure 2-chloroethyl 8-quinolyl carbonate, M.P. 68–69° C. and analyzing as follows:

|  | Found | Calcd. for $C_{12}H_{10}ClNO_3$ |
|---|---|---|
| Percent C | 56.35 | 57.26 |
| Percent H | 3.87 | 4.00 |
| Percent Cl | 14.01 | 14.08 |

Example II

A solution composed of 600 ml. of pyridine and 29.0 g. (0.2 mole) of 8-quinolinol was charged to a four-necked flask which was fitted with a stirrer, reflux condenser and thermometer, and mounted in an ice bath. p-Chlorophenyl chloroformate in the amount of 37.4 g.

(0.2 mole) was then slowly added to the solution and the reaction mixture thus formed was allowed to stand about 16 hours while stirring and maintaining temperature at about 40° C. The solvent pyridine, was then removed under vacuum and mild heating, i.e., about 35–40° C. The residue was then hydrolyzed with 0.1 liter of water containing sodium acetate as a buffer. A solid, the desired product, was formed, which was filtered from the hydrolyzed mixture. 16.7 g. were obtained having a melting point of 144–166° C. The aqueous filtrate was washed with ether several times, discarding the aqueous layer. The ether layers were stripped of excess ether and 37.6 g. of the desired product were obtained. The solids were combined and recrystallized from hexane and were found upon analysis to be the desired product p-chlorophenyl 8-quinolyl carbonate ($C_{16}H_{10}NOCl_3$) (M.P. 118–119° C., yield 90%): Calculated—percent C, 64.11; percent H, 3.33; percent Cl, 11.83; percent N, 4.67. Found—percent C, 64.05, 64.10; percent H, 3.43, 3.44; percent Cl 12.00, 11.86; percent N 4.85, 4.70.

As pointed out at an earlier point herein, these new compounds are biologically effective and, as will be described more fully hereinafter, they may be compounded according to all common methods for convenience of application in the control of various organisms. The concentration of the compounds for toxicity to living organism is very small, e.g., from 1 part by weight in 10,000 to 1 part per 1,000,000 by weight of the carrier or vehicle, depending upon the organism being treated and the particular compound of the generic formula which is employed.

The new compounds of this invention are especially useful as the active ingredient in toxic quantities in soil-fungicidal compositions, and in sanitization compositions, i.e., cleaning compositions which are also toxic to bacteria, e.g., soap bacteriostats. The compounds are useful also as industrial preservative agents.

The exemplary procedures which illustrate effectiveness as soap bacteriostats consist essentially of adding a stated amount of the compound to a soap solution and preparing serial dilutions of this composition in agar. The agar dilutions are then inoculated with different microbes, incubated at a definite temperature for a definite time after which the dilutions are examined to determine inhibition of growth by the test compound.

*Example III*

This example shows testing of 2-chloroethyl 8-quinolyl carbonate against *Staphylococcus aureus*. A 0.2-percent stock solution of 2-chloroethyl 8-quinolyl carbonate prepared from a soap solution (10 g. Ivory Snow in 80 ml. distilled water) was diluted in nutrient agar to provide test samples containing one part of the carbonate per 100,000 parts of the agar. Petri dishes were respectively filled with the test mixture, and the plates thus prepared were then respectively inoculated with said *Staphylococcus aureus* organism and incubated for 48 hours at 37° C. At the end of that time, inspection of the plates showed complete inhibition of growth of the organism, while identical agar test plates, except that the carbonate was not present, showed normal uninhibited bacterial growth.

*Example IV*

This example shows testing of 2-chloroethyl 8-quinolyl carbonate against *Salmonella typhosa*. A 0.2-percent stock solution of 2-chloroethyl 8-quinolyl carbonate prepared from a soap solution (10 g. Ivory Snow in 80 ml. distilled water) was diluted in nutrient agar to provide test samples containing one part of the carbonate per 10,000 parts of the agar. Petri dishes were respectively filled with the test mixture, and the plates thus prepared were then respectively inoculated with said *Salmonella typhosa* organism and incubated for 48 hours at 37° C. At the end of that time, inspection of the plates showed complete inhibition of growth of the organism, while identical agar test plates, except that the carbonate was not present, showed normal uninhibited bacterial growth.

*Example V*

This example shows testing of p-chlorophenyl 8-quinolyl carbonate against *Staphylococcus aureus*. A 0.2-percent stock solution of p-chlorophenyl 8-quinolyl carbonate prepared from a soap solution (10 g. Ivory Snow in 80 ml. distilled water) was diluted in nutrient agar to provide test samples containing two parts of the carbonate per 1,000,000 parts of the agar. Petri dishes were respectively filled with the test mixture, and the plates thus prepared were then respectively inoculated with said *Staphylococcus aureus* organism and incubated for 48 hours at 37° C. At the end of that time, inspection of the plates showed complete inhibition of growth of the organism, while identical agar test plates, except that the carbonate was not present, showed normal uninhibited bacterial growth. Subsequent testing against *Staphylococcus aureus* reveals effectiveness at one part per million.

*Example VI*

This example shows testing of p-chlorophenyl 8-quinolyl carbonate against *Salmonella typhosa*. A 0.2-percent stock solution of p-chlorophenyl 8-quinolyl carbonate prepared from a soap solution (10 g. Ivory Snow in 80 ml. distilled water) was diluted in nutrient agar to provide test samples containing ten parts of the carbonate per 1,000,000 parts of the agar. Petri dishes were respectively filled with the test mixture, and the plates thus prepared were then respectively inoculated with said *Salmonella typhosa* organism and incubated for 48 hours at 37° C. At the end of that time, inspection of the plates showed complete inhibition of growth of the organism, while identical agar test plates, except that the carbonate was not present, showed normal uninhibited bacterial growth.

*Example VII*

A 1-percent stock solution of the compound 2-chloroethyl 8-quinolyl carbonate in a non-toxic solvent was made up, and this solution was added to sterile, melted dextrose agar in a quantity to give 1 part of the said compound per 10,000 parts of agar. After thorough mixing, the thus treated agar was poured into Petri dishes and allowed to harden. One drop of a spore suspension of the fungus *Aspergillus niger* was employed as inoculum for each plate. The inoculated plates were incubated at a temperature of 25° C. for five days. At the end of that time, inspection of the dishes showed complete inhibition of growth of the fungus, while plates not containing the said compound, but otherwise identical and incubated similarly, showed normal uninhibited growth.

*Example VIII*

A 1-percent stock solution of the compound p-chlorophenyl 8-quinolyl carbonate in a non-toxic solvent was made up, and this solution was added to sterile, melted dextrose agar in a quantity to give 1 part of the said compound per 10,000 parts of agar. After thorough mixing, the thus treated agar was poured into Petri dishes and allowed to harden. One drop of a spore suspension of the fungus *Aspergillus niger* was employed as inoculum for each plate. The inoculated plates were incubated at a temperature of 25° C. for five days. At the end of that time, inspection of the dishes showed complete inhibition of growth of the fungus, while plates not containing the said compound, but otherwise identical and incubated similarly, showed normal uninhibited growth.

The new compounds herein are found to have biological activity against still other organisms. For example, p-chlorophenyl 8-quinolyl carbonate was found to be active against the following organisms at the indicated concentrations.

| Organism: | concentration |
|---|---|
| Bacillus cereus var. mycoides | [1] 1/M |
| Bacterium ammoniagenes | [2] 1/100T |
| Escherichia coli | 1/10T |
| Erwinia atroseptica | 1/10T |
| Pseudomonas aeruginosa | 1/10T |
| Bacillus subtilis | 1/100T |
| Penicillium expansum | 1/10T |
| Fomes annosus | 1/100T |
| Trichoderma sp. T–1 | 1/10T |
| Ceratostomella pilifera | 1/100T |
| Aspergillus oryzae | 1/10T |
| Cladosporium herbarum | 1/10T |
| Myrothecium verrucaria | 1/10T |
| Monolinia fructicola | 1/10T |
| Linztes trabea | 1/100T |

[1] M=1,000,000.
[2] T=1,000.

When employed as bacteriostats, the new compounds herein may be incorporated into inert organic solvents, or into emulsions prepared by mixing such solutions of the compounds with water in the presence of an emulsifying agent. The compounds may also be admixed with soaps or synthetic detergents either solid or liquid for use as germicidal cleansing compositions.

When used as fungicidal agents, the new compounds of the invention may be employed according to any suitable method. They may be included with other materials that are being applied to plants or the soil, e.g., insecticides, herbicides, fertilizers, soil conditioners, etc. Thus, they may be employed as sprays, or dusts and may suitably be employed with inert carriers and diluents as desired, e.g., talc, clay, lime, bentonite, pumice, etc., either alone or with other agents of kindred nature.

While the invention herein has been described with respect to particular embodiments those skilled in the art will appreciate that various modifications within the spirit of the invention may be derived from the teachings herein. Accordingly, this invention is not to be restricted unduly and is to be understood to extend to all modifications which flow from the teachings herein.

What is claimed is:

1. A compound of the formula:

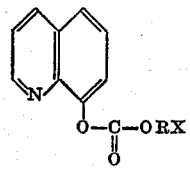

where R is selected from the group consisting of alkyl, cycloalkyl, phenyl and alkylphenyl radicals of two to eight carbon atoms, and X is selected from the group consisting of halogen and alkoxy and cycloalkoxy radicals of one to six carbon atoms.

2. 2-chloroethyl 8-quinolyl carbonate.
3. p-Chlorophenyl 8-quinolyl carbonate.
4. The method of inhibiting the growth of fungi and bacteria which comprises contacting the same with a compound of the formula:

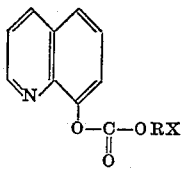

where R is selected from the group consisting of alkyl, cycloalkyl, phenyl and alkylphenyl radicals of two to eight carbon atoms, and X is selected from the group consisting of halogen and alkoxy and cycloalkoxy radicals of one to six carbon atoms in a quantity which is toxic to said fungi and bacteria.

5. The method of inhibiting the growth of fungi and bacteria which comprises contacting the same with 2-chloroethyl 8-quinolyl carbonate in a quantity which is toxic to said fungi and bacteria.

6. The method of inhibiting the growth of fungi and bacteria which comprises contacting the same with p-chlorophenyl 8-quinolyl carbonate in a quantity which is toxic to said fungi and bacteria.

References Cited in the file of this patent

UNITED STATES PATENTS

| 2,290,846 | Ellis et al. | July 21, 1942 |
| 2,875,126 | Hodel et al. | Feb. 24, 1959 |

OTHER REFERENCES

Beilstein's Handbuch der Organischen Chemie, vol. 21, Main Work, page 93 (1935).